(12) United States Patent
Takamatsu et al.

(10) Patent No.: US 11,752,868 B2
(45) Date of Patent: Sep. 12, 2023

(54) INSTRUMENT DEVICE FOR A VEHICLE

(71) Applicant: Yazaki Corporation, Tokyo (JP)

(72) Inventors: Masahiro Takamatsu, Makinohara (JP); Masahide Nagata, Makinohara (JP); Masanobu Terao, Makinohara (JP); Takao Kanai, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/359,839

(22) Filed: Jun. 28, 2021

(65) Prior Publication Data

US 2022/0001746 A1 Jan. 6, 2022

(30) Foreign Application Priority Data

Jul. 6, 2020 (JP) ................................ 2020-116093

(51) Int. Cl.
| | | |
|---|---|---|
| *B60K 35/00* | (2006.01) | |
| *H01R 12/71* | (2011.01) | |
| *B60Q 3/10* | (2017.01) | |
| *B60Q 3/06* | (2006.01) | |
| *B60Q 3/16* | (2017.01) | |

(52) U.S. Cl.
CPC ............... *B60K 35/00* (2013.01); *B60Q 3/10* (2017.02); *B60Q 3/16* (2017.02); *H01R 12/714* (2013.01); *B60K 2370/167* (2019.05); *B60K 2370/33* (2019.05); *B60K 2370/42* (2019.05)

(58) Field of Classification Search
CPC .. B60K 370/33; B60K 370/42; B60K 370/67; B60K 35/00; B60K 2370/33; B60K 2370/42; B60K 2370/67; H01R 12/714; B60Q 3/10; B60Q 3/16
See application file for complete search history.

(56) References Cited

U.S. PATENT DOCUMENTS

| | | | | |
|---|---|---|---|---|
| 3,400,358 | A * | 9/1968 | Byrnes | H01R 13/33 439/825 |
| 5,199,879 | A * | 4/1993 | Kohn | H05K 3/326 439/82 |
| 5,548,486 | A * | 8/1996 | Kman | H01R 12/523 439/82 |
| 7,944,710 | B2 * | 5/2011 | Marten | H05K 3/368 174/265 |

(Continued)

FOREIGN PATENT DOCUMENTS

| | | |
|---|---|---|
| EP | 1 541 972 A1 | 6/2005 |
| JP | 2005-197295 A | 7/2005 |

(Continued)

*Primary Examiner* — Evan P Dzierzynski
*Assistant Examiner* — Nathaniel J Lee
(74) *Attorney, Agent, or Firm* — Sughrue Mion, PLLC

(57) ABSTRACT

An objective of the present invention is to provide an instrument device for a vehicle which can reduce the costs and may also achieve a reduced weight. An instrument device for a vehicle includes a main board with an electronic component mounted thereto, the electronic component being independent from a design of a dial plate, and a sub-board with an electronic component mounted in a position corresponding to the design of the dial plate, wherein the main board and the sub-board are directly joined and electrically connected to each other.

8 Claims, 3 Drawing Sheets

(56) References Cited

U.S. PATENT DOCUMENTS

| | | | |
|---|---|---|---|
| 2005/0012607 A1* | 1/2005 | Sumiya | G01D 7/12 |
| | | | 340/461 |
| 2008/0013594 A1 | 1/2008 | Kawate | |
| 2011/0006684 A1* | 1/2011 | Hodgson | B60Q 3/74 |
| | | | 362/549 |

FOREIGN PATENT DOCUMENTS

| | | |
|---|---|---|
| JP | 2006-162569 A | 6/2006 |
| JP | 2017-116358 A | 6/2017 |

* cited by examiner

INSTRUMENT DEVICE FOR A VEHICLE

BACKGROUND OF THE INVENTION

Technical Field

The present invention relates to an instrument device to be mounted to a vehicle.

Background Art

An instrument device for a vehicle has various indicator meters such as a speedometer accommodated in a meter case, wherein a circuit board is mounted to a back side of the meter case, the circuit board being configured to receive various measurement signals as inputs. On the circuit board, a control circuit such as a microcomputer, an internal driving device for the indicator meters such as a stepper motor, and a light emitting element are mounted for example, the control circuit being configured to control the entire meters, and the light emitting element being configured to illuminate an illuminated section of a dial plate.

Here, the light emitting element and/or the internal driving device etc. as described above may be mounted in various positions depending on a design of the dial plate. Particularly the light emitting elements are positioned in a wide range of the dial plate which results in an increased board size in order to cover the range for positioning the light emitting elements. Further, since the circuit board is formed in a shape which is adapted to the dial plate, the versatility is low and the standardization is difficult.

In order to address such a problem, Patent Document 1 describes that a light source is installed directly on a back face side of the dial plate. This document further describes that a thinner configuration and a reduced weight of the instrument device may be enabled, and that it is also possible to reduce the component costs.

CITATION LIST

Patent Literature

Patent Document 1: JP 2017-116358 A

SUMMARY OF THE INVENTION

According to Patent Document 1, the light source is installed directly on a back face side of the dial plate so that the light source and the dial plate surface are too close to each other to emit and/or diffuse a light in an appropriate manner. This means that there is the problem that the light source which is too near results in a too strong light and thus in unnecessarily strong illumination of the dial plate. Patent Document 1 provides an illuminated room layer which causes a light to be diffused. However, when the dial plate has a too large thickness in order to enable the illuminated room layer to function effectively, a weight of the dial plate is increased so that it is not possible to achieve a reduced weight.

Furthermore, the invention according to Patent Document 1 utilizes a connector for connection between a main board and the dial plate. As a result, a division of a circuit into two components, i.e. the main board and the dial plate, results in that the number of components is increased by the number of connectors, which causes a rise in the costs practically.

Therefore, in view of the problems as described above, an objective of the present invention is to provide an instrument device for a vehicle which can reduce the costs and may also achieve a reduced weight.

In order to achieve the objective as described above, the present invention provides an instrument device for a vehicle including a main board with an electronic component mounted thereto, the electronic component being independent from a design of a dial plate, and a sub-circuit body with an electronic component positioned in a position corresponding to the design of the dial plate, wherein the main board and the sub-circuit body are directly joined and electrically connected to each other.

According to the present invention as described above, the circuit is divided into the main board and the sub-circuit body, the main board including the electronic component which is independent from the design of the dial plate, and the sub-circuit body including the electronic component which is positioned in the position corresponding to the design of the dial plate. For the main board, this may enable it to be standardized independently from the design, which may allow the costs to be reduced. Furthermore, the main board and the sub-circuit body are directly joined to each other, so that no connector is necessary for connection between these components, which may allow the costs to be reduced while reducing the weight.

DETAILED DESCRIPTION OF THE PREFERRED EMBODIMENTS

Figure 1:
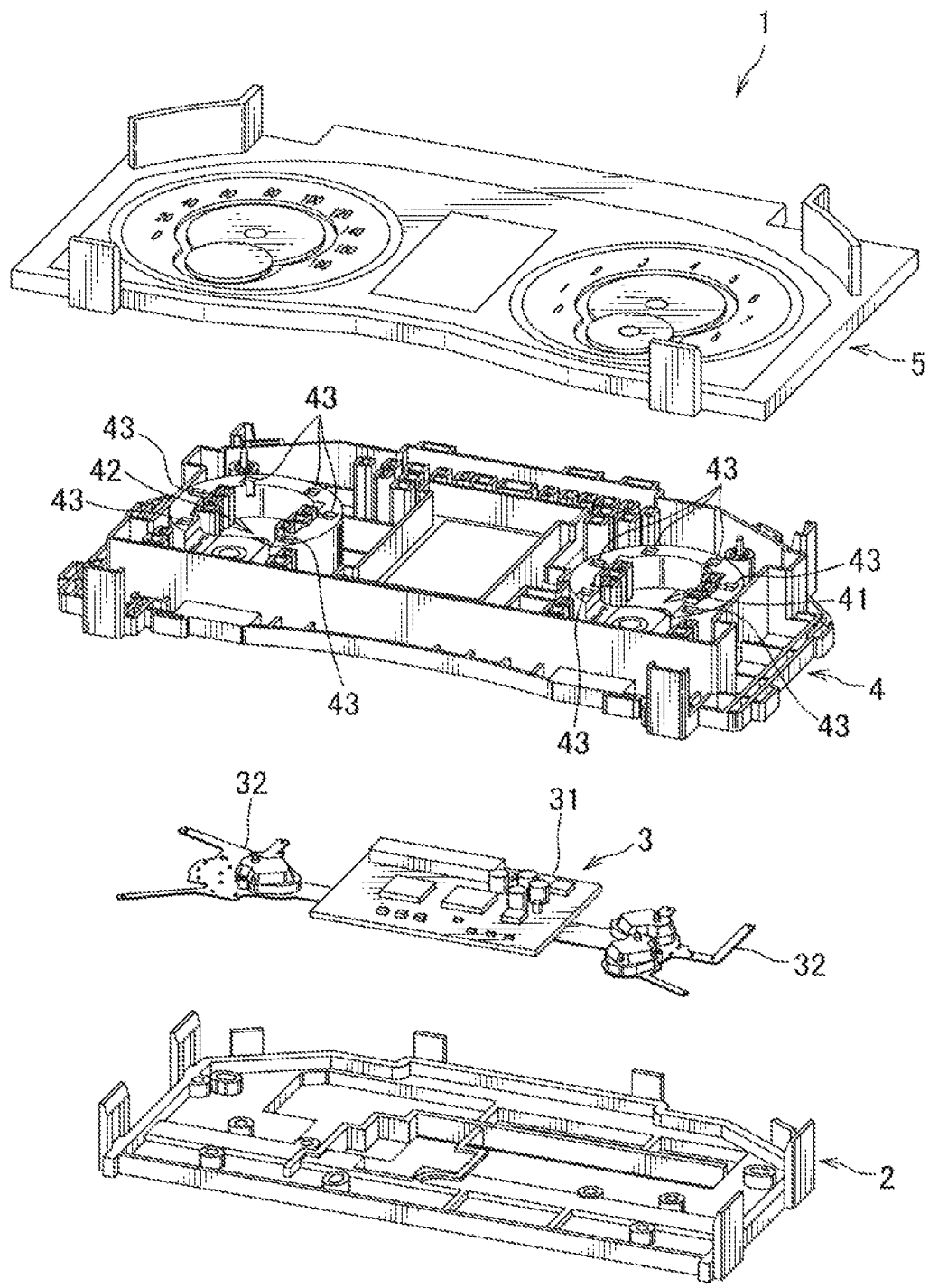
FIG. 1 is an exploded perspective view of an instrument device for a vehicle according to an embodiment of the present invention.

Hereinafter, an embodiment of the present invention will be described with reference to the Drawings. FIG. 1 shows an exploded perspective view of an instrument device for a vehicle according to an embodiment of the present invention. As shown in FIG. 1, the instrument device 1 includes a back case 2, a board 3, a meter case 4 and a dial plate 5.

The back case 2 has e.g. a recess formed therein which is capable of accommodating e.g. an electronic component to be mounted to the board 3, wherein the back case 2 is formed from a monolithic molded part having an outer substantially rectangular shape which is made of resin. The back case 2 has e.g. a boss for screwing to the board 3 to the back case 2.

The board 3 has e.g. positioning hole for engaging the boss of the back case 2 therewith. The board 3 includes a main board 31 and a sub-board 32, wherein the main board 31 is formed by a multilayer rigid board, and the sub-board 32 is formed by a flexible board. The board 3 will be described in details below.

The meter case 4 is formed by a monolithic molded part having an outer substantially rectangular shape which is made of resin. The meter case 4 has e.g. a mounting section for mounting the back case 2 thereto and/or a mounting section for mounting the dial plate 5 thereto. The meter case 4 has motor accommodating chambers 41, 42 and LED accommodating chambers 43, wherein the motor accommodating chambers 41, 42 are spaces for accommodating stepper motors therein and the LED accommodating chambers 43 are spaces for accommodating LEDs as light emitting elements for illuminating the dial plate 5, the stepper motors form internal driving devices for indicator meters.

The motor accommodating chamber 41 is provided for accommodating e.g. a stepper motor for a tachometer. The motor accommodating chamber 42 is provided for accommodating e.g. a stepper motor for a speedometer. A plurality of LED accommodating chambers 43 is formed in the meter case 4. The plurality of LED accommodating chambers 43 is formed corresponding to positions on the dial plate 5 which are to be illuminated.

The dial plate 5 is formed by a substantially rectangular plate body, wherein the dial plate 5 has various designs such as a scale, pattern, symbol, letter, and/or decoration, the designs corresponding to information about a vehicle at which the instrument device 1 is installed. The dial plate 5 has e.g. a speedometer dial design and/or a tachometer dial design which are formed in a well-known manner, such as via printing.

Next, the board 3 will be described in details with reference to FIG. 2. As mentioned above, the board 3 includes the main board 31 and the sub-board 32. The main board 31 is formed by the multilayer rigid board with a substantially rectangular shape. On the main board 31, a microcomputer, a regulator, and electronic components are mounted, for example, wherein the microcomputer controls the entire instrument device 1, and the regulator supplies power into the board, the electronic components being standardized independently from a type of the instrument device 1, e.g. external connectors for connection to the outside of the instrument device 1. Further, a liquid crystal display may be mounted to the main board 31. In this case, a GDC (graphics display controller) is mounted to the main board 31 together. Accordingly, the main board 31 has electronic components mounted thereto which are independent from the design of the dial plate 5.

Furthermore, with regard to the main board 31, it is possible to standardize it for different performances of the microcomputer, by selecting an any appropriate number of layers of the main board 31 depending on how many electric connections a microcomputer to be mounted has. For example, an eight-layer main board 31 is used for a high-performance microcomputer, while a four-layer main board 31 is used for a low-performance microcomputer. Similarly, in the case of the main board 31 which is equipped with a liquid-crystal display, it may be allowed to standardize the main board 31. For example, in the case of the main board 31 which is equipped with a seven-inch liquid crystal display, the main board 31 can be standardized for any vehicle type having a design for a meter which uses a seven-inch liquid crystal display for the dial plate.

On the sub-board 32, the stepper motors and the LEDs as described above are mounted, for example. According to FIG. 2, the sub-board 32 is formed by a first sub-board 32a and a second sub-board 32b. On the first sub-board 32a, an internal driving device for an indicator meter and LEDs corresponding to a design to be illuminated are mounted, wherein the indicator meter and the design are arranged on a right side of the instrument device 1 when the instrument device 1 is viewed from its front side. On the second sub-board 32b, an internal driving device for an indicator meter and LEDs corresponding to a design to be illuminated are mounted, wherein the indicator meter and the design are arranged on a left side of the instrument device 1 when the instrument device 1 is viewed from its front side. This means that the sub-board 32 has only e.g. electronic components and components related to the electronic components, wherein the electronic components are arranged depending on the designs of the dial plate 5. Namely, on the sub-board 32, the electronic components are mounted in positions corresponding to the design of the dial plate 5.

As described above, the sub-board 32 is equipped with the LEDs (designated by the reference sign 321 in FIG. 2) and the stepper motors (designated by the reference sign 320 in FIG. 2) as well as their peripheral circuits etc. The LEDs 321 should be mounted in positions corresponding to the design to be illuminated. Therefore, the sub-board 32 has a shape which includes at least mounting positions for the LEDs 321, as shown in FIG. 2.

Figure 3:
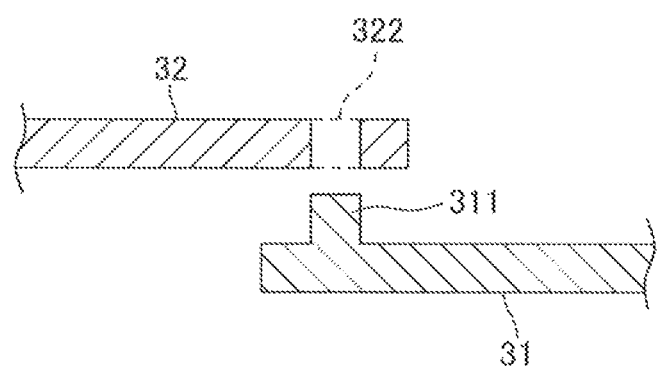
FIG. 3 is a sectional view of a connected portion between a main board and a sub-board according to FIG. 2.

Furthermore, the main board 31 and the sub-board 32 are directly joined to each other without connecting components such as connectors. A joined portion between the main board 31 and the sub-board 32 is shown in FIG. 3. The main board 31 has a protrusion 311 at its edge. At least around this protrusion 311, a pattern of a conductor is formed for electric connection to the sub-board 32 as described below. This pattern is connected to a circuit wiring on the main board 31.

The sub-board 32 has a hole 322 at its end. Also around this hole 322, a conductor pattern is formed. This pattern is connected to a circuit wiring on the sub-board 32. Then, the protrusion 311 is introduced into and engaged with the hole 322, and soldering is performed to fix them. In this manner, the main board 31 and the sub-board 32 are directly joined and electrically connected to each other. Further, instead of mating the main board 31 with the sub-board 32 by means of the protrusion 311 and/or hole 322, other methods such as a ACF (anisotropic conductive film) process may be used in order to directly join the boards.

Figure 2:
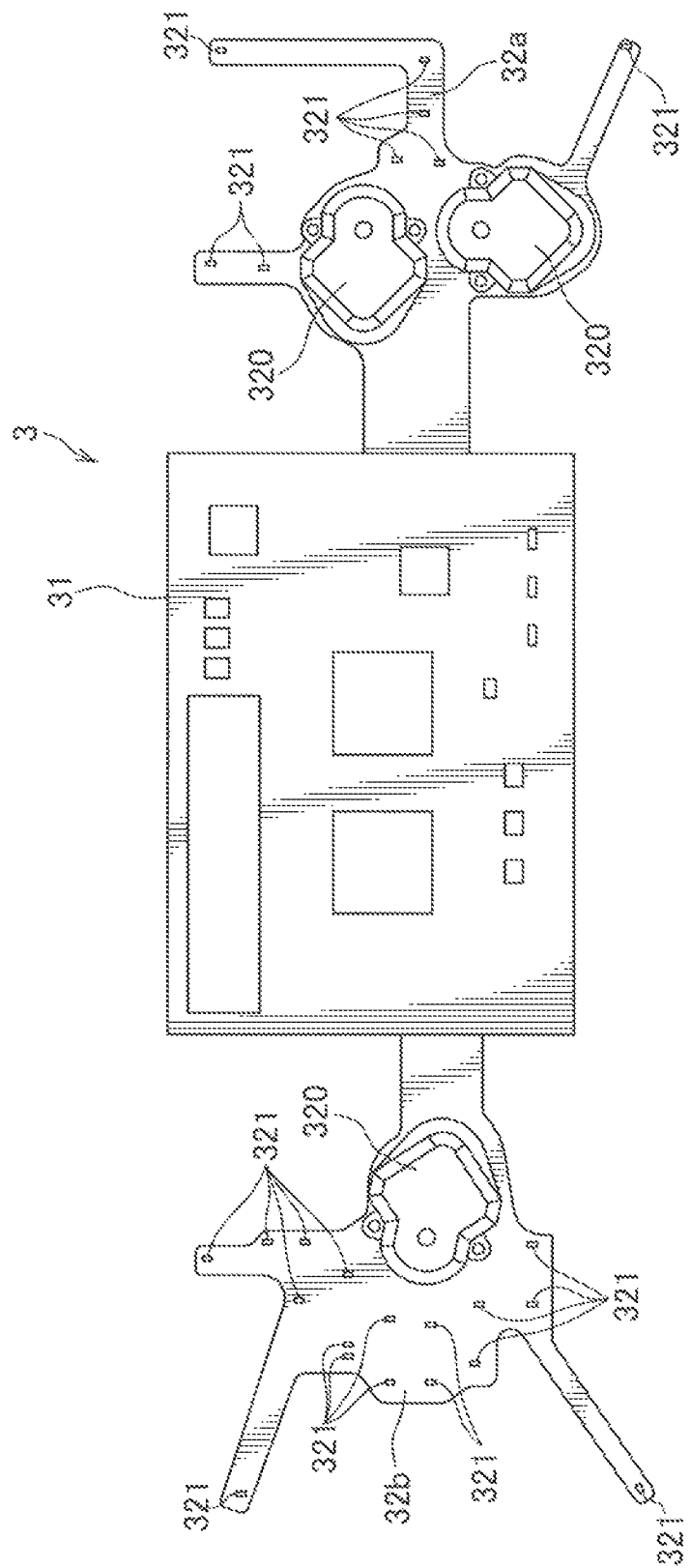
FIG. 2 is a front view of a board according to FIG. 1.

Furthermore, although FIGS. 1 to 3 show an example where the sub-circuit body is formed by the flexible board, the circuit body may be formed by mounting e.g. the stepper motors and/or LEDs directly in the meter case 4. This means that the sub-circuit body may not use a board. In this case, the stepper motors, the LEDs and/or other elements for forming the circuit body such as wiring may be embedded in the meter case 4, or exposed e.g. for a wiring cable. In this case, the sub-circuit body and the main board may be connected by soldering a conductor section, such as a conductor section of the wiring cable, directly to a pad etc. on the main board 31, for example. This enables a thickness of the case and thus an amount of resin used for the meter case 4 to be reduced.

According to the present embodiment, the instrument device 1 for a vehicle includes the main board 31 with the electronic components mounted thereto, the electronic components being independent from the design of a dial plate 5, and the sub-boards 32 with the electronic components mounted in the positions corresponding to the design of the dial plate 5, wherein the main board 31 and the sub-boards 32 are directly joined and electrically connected to each other.

The above-described configuration of the instrument device 1 may enable the main board 31 to be standardized independently from the design, which may allow the costs to be reduced. Furthermore, the main board 31 and the sub-boards 32 are directly joined to each other, so that no connector is necessary for connection between these components, which may allow the costs to be reduced while reducing the weight. Moreover, the main board 31 is miniaturized as compared with a conventional meter board, so that an increased number of boards can be yielded during the production, which can achieve low-cost boards. Additionally, for mounting device components (SMT-process), the miniaturization may increase an amount which can be supplied to the process, so that the processing costs can be reduced as compared with conventional instrument devices for a vehicle.

Further, the sub-boards 32 include the LEDs 321 and stepper motors 320, so that the sub-boards 32 can be adapted to different designs of the dial plate 5 corresponding to different types of meter. Furthermore, the LEDs 321 are mounted to the sub-boards 32, so that the LEDs 321 and the dial plate 5 are spaced from each other by an appropriate distance, which enables appropriate light emitting and/or diffusion.

Moreover, the sub-boards 32 are formed by flexible boards, so that the sub-boards 32 can be reduced in weight as compared with a rigid board. Simultaneously, this enables the sub-boards 32 to be bent to a certain extent, whereby more degrees of freedom are possible for the arrangement. Further, the configuration with flexible boards eliminates the need for a shield arranged on a back side of the boards, which may allow the costs to be reduced.

Furthermore, for forming the sub-circuit body, the electronic components may be mounted directly in the meter case 4. In this case, it is not necessary to use a board. Further, it is possible to reduce a thickness of the case and thus an amount of resin used for the meter case 4.

Moreover, the main board 31 has the microcomputer mounted thereto which is configured to control the entire instrument device 1, so that it may be allowed to standardize and/or group the main board for different types of microcomputer. In this manner, the costs may be reduced. Further, it is possible to reduce the development costs for software development, since the main board can be shared for various vehicles (or applied to various vehicles by adaptation only to a difference(s) without changing the basic configuration).

It is to be noted that the sub-boards 32 are not limited to flexible boards, but may be formed with low-cost boards such as paper-phenolic boards since the sub-boards 32 are not equipped with high-performance components such as a microcomputer.

The present invention is not limited to the above-described embodiments. This means that those skilled in the art may implement various modifications in view of the conventional knowledge within the scope which does not depart from the core of the present invention. It is to be understood that such modifications also fall within the scope of the present invention as long as they include features of the instrument device according to the present invention.

REFERENCE SIGNS LIST

1 Instrument device for a vehicle
4 Meter case
5 Dial plate
31 Main board
32 Sub-boards (Sub-circuit body)
320 Stepper motor (internal driving device)
321 LEDs (light emitting elements)

What is claimed is:

1. An instrument device for a vehicle, comprising:
a main board with an electronic component mounted thereto, the electronic component being independent from a design of a dial plate; and
a sub-circuit body with an electronic component mounted in a position corresponding to the design of the dial plate,
wherein the main board has a protrusion at an edge of the main board, wherein a pattern of a conductor is formed around the protrusion for electric connection to the sub-circuit body,
wherein the sub-circuit body has a hole at an end of the sub-circuit body, wherein a conductor pattern is formed around the hole, and
wherein the main board and the sub-circuit body are directly joined and electrically connected to each other by introducing the protrusion into and engaging with the hole,
wherein in a direction extending along a plane of the main board, a position on the main board in which the electronic component is mounted is offset from a position on the sub-circuit body in which the electronic component is mounted,
wherein the sub-circuit body is extended away from the protrusion such that, of the main board, only a minority of the main board is overlapped by the sub-circuit body,
wherein the protrusion of the main board is protruded into and engaging with the hole in a first direction that is facing away from the dial plate, and
wherein the electronic component of the main board is protruded from the main board in a second direction that is facing towards the dial plate and is opposite to the first direction.

2. The instrument device according to claim 1,
wherein the sub-circuit body includes a light emitting element for illuminating the dial plate, and an internal driving device for an indicator meter.

3. The instrument device according to claim 2,
wherein the sub-circuit body is formed by a flexible board.

4. The instrument device according to claim 2,
wherein the sub-circuit body is formed by mounting an electronic component directly to a meter case, wherein the meter case is disposed between the main board and the dial plate.

5. The instrument device according to claim 2,
wherein the main board includes a microcomputer mounted thereto, wherein the microcomputer is configured to control the instrument device entirely.

6. The instrument device according to claim 1,
wherein the main board includes a microcomputer mounted thereto, wherein the microcomputer is configured to control the instrument device entirely.

7. The instrument device according to claim 1, wherein the sub-circuit body is extended, in a third direction that is perpendicular to each of the first direction and the second direction, away from the protrusion of the main board such that a majority of the main board is not overlapping the sub-circuit body in any of the first direction and the second direction and such that a majority of the sub-circuit body is not overlapping the main board in any of the first direction and the second direction.

8. The instrument device according to claim 1,
wherein the main board comprises a first face from which, in the second direction that is facing towards the dial plate, the electronic component is protruded,
wherein the main board comprises a second face, facing opposite to the first face, from which, in the first direction, the protrusion is protruded from the main board and into the hole of the sub-circuit body,
wherein a face of the sub-circuit body comprises an opening of the hole into which the protrusion of the main board is protruded into, and wherein the second face of the main board, from which the protrusion is protruded, faces the face of the sub-circuit body.

\* \* \* \* \*